Dec. 17, 1929.　　　A. SCHMIDT　　　1,740,205
RAPID STEWING POT
Filed Aug. 17, 1928
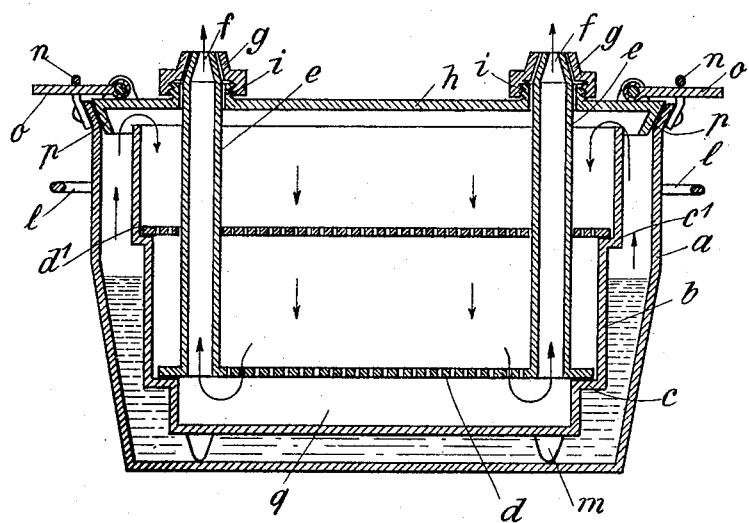

Patented Dec. 17, 1929

1,740,205

UNITED STATES PATENT OFFICE

ARTHÜR SCHMIDT, OF BERLIN-HALENSEE, GERMANY

RAPID-STEWING POT

Application filed August 17, 1928, Serial No. 300,186, and in Germany August 20, 1927.

This invention relates to a rapid stewing pot for victuals of any kind, specially meat, fishes, vegetables, fruits, in flowing hot steam.

The invention consists in a specially practical construction of the stewing pot of simplest form. The essential advantage consists in that the victuals to be stewed are not at all in contact with boiling water, only live steam flowing continually around said victuals before it escapes into the atmosphere. The stewing effect is thus considerably accelerated, the expenses for heating are reduced, and not only the important nutritive substances in general but specially the important nutritive salts are preserved in the stewed victuals. The natural taste, good appearance and natural form of the victuals are preserved, any disagreeable smells being removed with the escaping steam. By subdividing the stewing space it becomes possible to prepare simultaneously several different victuals. The stewing pot may also be used as sterilizing apparatus.

The stewing pot according to the invention is shown, by way of example, in vertical section in the only figure of the accompanying drawing.

The rapid stewing pot, according to the invention, consists of an outer vessel $a$ with lid $h$ and of an insertion vessel $b$ open at the top end and having feet $m$ resting on the bottom plate of the outer vessel, a hollow space designed to contain water up to a certain height being formed between said outer vessel and said insertion vessel. The upper rim of the insertion vessel is at a certain distance below the lid of the outer vessel.

In the insertion vessel $b$ two circular shoulders $c$, $c_1$ are arranged at different heights designed to support each one perforated plate $d$, $d_1$, on which the victuals to be stewed are to be placed. The space $q$ between the lower perforated plate $d$ and the bottom plate of the insertion vessel serves for collecting the juice from the stewed victuals and further as passage for the flowing steam.

In the lower perforated plate $d$ several tubes $e$ are fixed which communicate at the lower end with the space $q$ under the perforated plate $d$ and project through the upper perforated plate $d_1$ and through the lid $h$. The lid $h$ has externally threaded tubular extensions $i$ at the points at which the tubes $e$ project through it, a nut $g$ being screwed on each tubular extension $i$. The upper end $f$ of each tube $e$ is conical and forms a nozzle, the conical inner surfaces of the cap nuts $g$ bearing against the conical end $f$ of the corresponding tubes $e$ so that the points at which said tubes project through the lid $h$ are tightly packed. A conical flange $p$ of lid $e$ fits tightly into the conical rim of the outer vessel $a$. The lid $h$ is pressed into the outer vessel $a$ by means of a closing lever $o$ and hooks $p$. The vessel $a$ has handles $l$.

When the water in the vessel $a$ is heated, the steam rises in the free space between the outer vessel and the insertion vessel and flows over the rim of the insertion vessel $b$ along the victuals on the perforated plates $d_1$ and $d$ and through these perforated plates into the space $q$ under the lower perforated plate $d$, to escape through the tubes $e$ into the atmosphere. By this circulating steam, flowing out continually and the circulation of which may be increased or decreased by a convenient regulating device, it is obtained that only fresh steam flows about the victuals to be stewed. The juice from the stewed victuals is collected in space $q$ without being diluted by water.

I claim:—

A rapid stewing pot, comprising in combination an outer vessel, a lid on said outer vessel fitting with a conical flange in the conical rim of said vessel, an insertion vessel with feet resting on the bottom plate of said outer vessel so that a free space partly filled with water is formed allround said insertion vessel the rim of said insertion vessel being a certain distance below said lid, perforated plates in said insertion vessel at different heights for carrying the victuals to to be stewed, adapted to conduct the steam into the space under the lower perforated plate, tubes in said lower perforated plate projecting through said lid, tubular extensions in said lid through which said tubes extend, a tapered top end of each tube, a nut with conical inner surface screwed on each tubular extension and bearing against the conical end of the corresponding tubes, and means for tightly pressing said lid on said outer vessel.

In testimony whereof I affix my signature.

ARTHUR SCHMIDT.